United States Patent
Kim et al.

(10) Patent No.: US 11,648,504 B2
(45) Date of Patent: May 16, 2023

(54) AIR CONDITIONING DEVICE AND CONTROL METHOD THEREOF

(71) Applicant: SAMSUNG ELECTRONICS CO., LTD., Suwon-si (KR)

(72) Inventors: Jeeyeon Kim, Suwon-si (KR); Yongwon Jeong, Suwon-si (KR); Saemi Kim, Suwon-si (KR); Sungwon Kim, Suwon-si (KR); Heejin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 524 days.

(21) Appl. No.: 16/728,831

(22) Filed: Dec. 27, 2019

(65) Prior Publication Data
US 2020/0206675 A1    Jul. 2, 2020

(30) Foreign Application Priority Data
Dec. 28, 2018    (KR) .................. 10-2018-0172479

(51) Int. Cl.
*B01D 53/02* (2006.01)
*B01D 53/04* (2006.01)
(Continued)

(52) U.S. Cl.
CPC ...... *B01D 53/0454* (2013.01); *F24F 11/0001* (2013.01); *B01D 2253/108* (2013.01);
(Continued)

(58) Field of Classification Search
CPC ........ B01D 2253/108; B01D 2253/202; B01D 2253/204; B01D 2253/25; B01D 53/04;
(Continued)

(56) References Cited

U.S. PATENT DOCUMENTS

| | | | | |
|---|---|---|---|---|
| 4,900,344 A | * | 2/1990 | Lansing | F24F 8/10 55/482 |
| 5,226,256 A | | 7/1993 | Fries et al. | |

(Continued)

FOREIGN PATENT DOCUMENTS

| | | |
|---|---|---|
| CN | 102944048 A | 2/2013 |
| CN | 105258241 A | 1/2016 |

(Continued)

OTHER PUBLICATIONS

International Search Report dated Apr. 17, 2020 issued by the International Searching Authority in counterpart International Application No. PCT/KR2019/018388 (PCT/ISA/210).
(Continued)

*Primary Examiner* — Christopher P Jones
(74) *Attorney, Agent, or Firm* — Sughrue Mion, PLLC

(57) ABSTRACT

An air purification device includes a driving part for changing a location thereof, a fan, a carbon dioxide absorption filter for absorbing carbon dioxide in the air, a filter reproduction part for removing carbon dioxide absorbed into the carbon dioxide absorption filter, and a processor configured to control the driving part such that the air conditioning device moves to an area that can support ventilation, and drive the filter reproduction part for removing carbon dioxide absorbed into the carbon dioxide absorption filter in the area that can support ventilation.

10 Claims, 14 Drawing Sheets

(51) Int. Cl.
*F24F 11/00* (2018.01)
*F24F 110/70* (2018.01)
*F24F 8/15* (2021.01)
*F24F 8/90* (2021.01)

(52) U.S. Cl.
CPC .. *B01D 2253/202* (2013.01); *B01D 2253/204* (2013.01); *B01D 2253/25* (2013.01); *B01D 2257/504* (2013.01); *B01D 2259/4508* (2013.01); *F24F 8/15* (2021.01); *F24F 8/90* (2021.01); *F24F 2011/0002* (2013.01); *F24F 2110/70* (2018.01)

(58) Field of Classification Search
CPC ... B01D 53/0454; F24F 11/0001; F24F 11/30; F24F 8/15; F24F 8/80; F24F 8/90; Y02C 20/40
See application file for complete search history.

(56) References Cited

U.S. PATENT DOCUMENTS

| | | | | |
|---|---|---|---|---|
| 5,428,964 | A * | 7/1995 | Lobdell | G05D 27/02 340/672 |
| 7,108,731 | B2 * | 9/2006 | Park | F24F 8/10 55/400 |
| 7,840,308 | B2 * | 11/2010 | Matsunaga | B25J 9/1694 700/254 |
| 8,496,737 | B2 * | 7/2013 | Kim | B01D 53/72 96/111 |
| 10,850,224 | B2 | 12/2020 | Meirav et al. | |
| 11,324,847 | B2 * | 5/2022 | Zhang | B01D 46/0036 |
| 2006/0059872 | A1 * | 3/2006 | Lee | B01D 46/10 55/356 |
| 2006/0137521 | A1 * | 6/2006 | Sung | B01D 46/0038 95/1 |
| 2011/0203174 | A1 | 8/2011 | Lackner | |
| 2015/0165368 | A1 | 6/2015 | Brunhuber et al. | |
| 2016/0354722 | A1 | 12/2016 | Yamamoto et al. | |
| 2017/0197173 | A1 | 7/2017 | Yamamoto et al. | |
| 2017/0350611 | A1 | 12/2017 | Su et al. | |
| 2018/0290104 | A1 | 10/2018 | Jong | |
| 2019/0360712 | A1 | 11/2019 | Park et al. | |

FOREIGN PATENT DOCUMENTS

| | | |
|---|---|---|
| CN | 205002259 U | 1/2016 |
| CN | 106891349 A | 6/2017 |
| CN | 108105901 A | 6/2018 |
| DE | 10 2016 100489 A1 | 7/2017 |
| JP | 2007-183032 A | 7/2007 |
| JP | 2017-206145 A | 11/2017 |
| JP | 2019-90546 A | 6/2019 |
| KR | 20-2008-0001872 U | 6/2008 |
| KR | 10-0856709 B1 | 9/2008 |
| KR | 10-2013-0096597 A | 8/2013 |
| KR | 10-1439523 B1 | 9/2014 |
| KR | 10-2015-0037925 A | 4/2015 |
| KR | 10-2016-0036257 A | 4/2016 |
| KR | 10-2017-0086246 A | 7/2017 |
| KR | 10-1808116 B1 | 12/2017 |
| KR | 10-1835320 B1 | 3/2018 |
| KR | 10-2018-0127595 A | 11/2018 |
| KR | 10-2020-0048377 A | 5/2020 |
| WO | 2004/101113 A1 | 11/2004 |

OTHER PUBLICATIONS

Written Opinion dated Apr. 17, 2020 issued by the International Searching Authority in counterpart International Application No. PCT/KR2019/018388 (PCT/ISA/237).
Communication dated Nov. 11, 2021 by the European Patent Office in European Patent Application No. 19902672.5.
Communication dated Jun. 27, 2022 by the China National Intellectual Property Administration in Chinese Patent Application No. 201980085626.8.
Communication dated Feb. 23, 2023 by the China National Intellectual Property Administration in Chinese Patent Application No. 201980085626.8.
Communication dated Jan. 3, 2023 by the Korean Intellectual Property Office in Korean Patent Application No. 10-2018-0172479.

* cited by examiner

① REMOVING CARBON DIOXIDE

② MOVING THE AIR CONDITIONING DEVICE

③ REMOVING CARBON DIOXIDE FROM THE CARBON DIOXIDE ABSORPTION FILTER

AIR CONDITIONING DEVICE AND CONTROL METHOD THEREOF

CROSS-REFERENCE TO RELATED APPLICATION(S)

This application is based on and claims priority under 35 U.S.C. § 119(a) from Korean Patent Application number 10-2018-0172479, filed on Dec. 28, 2018, in the Korean Intellectual Property Office, the disclosure of that is incorporated by reference herein in its entirety.

BACKGROUND

1. Field

The disclosure relates to an air conditioning device and a control method thereof, and more particularly, to a portable air conditioning device for safely and efficiently removing carbon dioxide from an indoor environment and a control method thereof.

2. Description of Related Art

Various types of gases exist in the atmosphere. In an indoor environment, carbon dioxide concentration may be used as a reference to indicate an amount of relative pollution of the indoor air environment. If concentration of carbon dioxide in the indoor environment is high, the possibility that the carbon dioxide may exert negative influence on a human body correspondingly increases. For example, as concentration of carbon dioxide in the indoor air increases, an alertness of a person may be lessened, and the person may become drowsy. Alternatively, symptoms such as muscle discomfort, headache, and dizziness may occur. According to research, as concentration of carbon dioxide becomes increases, movements during sleep increase, and thus a quality of sleep may also decrease.

Accordingly, detecting concentration of carbon dioxide in the indoor air environment and maintaining an appropriate concentration of carbon dioxide in the indoor air environment may promote health of individuals within the indoor environment.

SUMMARY

According to an embodiment, there is provided an air purification device for purifying indoor air including: a driving part configured to control a position of the air purification device within an indoor environment, a fan configured to circulate the indoor air, a carbon dioxide absorption filter configured to absorb carbon dioxide from the indoor air, a filter reproduction part configured to discharge the carbon dioxide absorbed into the carbon dioxide absorption filter, and a processor configured to: control the fan to circulate the indoor air through the carbon dioxide absorption filter, control the driving part to control the position of the air purification device to an area of the indoor environment that can support ventilation of the carbon dioxide absorbed into the carbon dioxide absorption filter outside of the indoor environment, and control the filter reproduction part to discharge the carbon dioxide absorbed into the carbon dioxide absorption filter outside the indoor environment.

According to an embodiment, there is provided a method of controlling an air purification device comprising a fan configured to circulate indoor air through the air purification device, a carbon dioxide absorption filter configured to absorb carbon dioxide from the indoor air, and a filter reproduction part configured to generate heat or light for removing carbon dioxide absorbed into the carbon dioxide absorption filter, the method including: driving the fan to circulate the indoor air through the carbon dioxide absorption filter, moving the air purification device to an area of the indoor environment that can support ventilation of the carbon dioxide absorbed into the carbon dioxide absorption filter outside of the indoor environment, and based on detection of insufficient sunlight, control the filter reproduction part to remove the carbon dioxide absorbed into the carbon dioxide absorption filter by generating heat or light.

DETAILED DESCRIPTION

Figure 1:
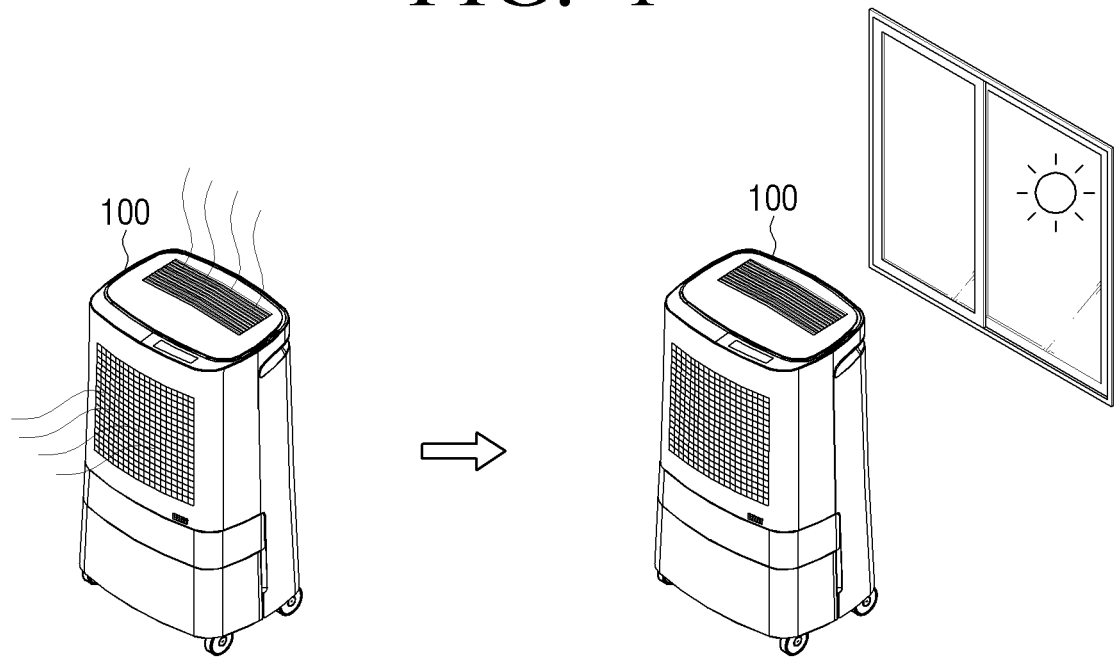
FIG. 1 is a diagram illustrating a method of an air conditioning device removing carbon dioxide from the indoor air environment according to an embodiment of the disclosure.
Figure 1:
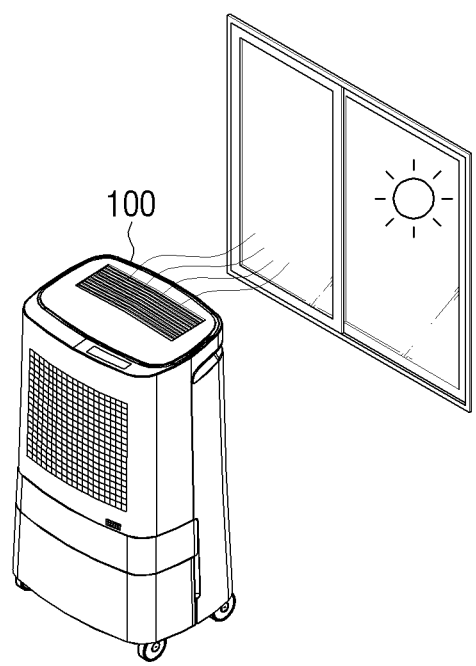

The disclosure was devised for addressing the aforementioned problems, and the disclosure provides an air conditioning device that removes carbon dioxide in an indoor environment by using a carbon dioxide absorption filter, and the air conditioning device moves to an area that can be ventilated and drives a filter reproduction part to remove carbon dioxide absorbed into the carbon dioxide absorption filter, and a control method thereof.

Hereinafter, the disclosure will be described in detail with reference to the accompanying drawings.

General terms that are currently used widely are selected as far as possible in describing the embodiments of the disclosure, in consideration of the functions described in the disclosure. However, the terms may vary depending on the intention of those skilled in the art who work in the pertinent field or emergence of new technologies. Also, in particular configurations, there may be new terms that are designated, and in such configurations, the meaning of the terms will be described in detail in the relevant descriptions in the disclosure. Thus, the terms used in the disclosure should be defined based on the meaning of the terms and the overall content of the disclosure, but not just based on the names of the terms.

Also, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but the disclosure should be interpreted to include all modifications, equivalents or alternatives of the embodiments included in the ideas and the technical scopes disclosed herein. configurationIn describing the embodiments, detailed explanation of related known technologies may unnecessarily confuse the gist of the disclosure, and such detailed explanation will be omitted.

Throughout the disclosure, singular expressions include plural expressions, as long as not conflicting in the context of the disclosure. In addition, in the disclosure, terms such as "include" and "consist of" should be construed as designating that there are such characteristics, numbers, steps, operations, elements, components or a combination thereof described in the specification, but not to exclude in advance the existence or possibility of adding one or more of other characteristics, numbers, steps, operations, elements, components or a combination thereof.

Also, the expression "at least one of A and/or B" should be interpreted to mean any one of "A" or "B" or "A and B."

In addition, the expressions "first," "second" and the like used in this specification may be used to describe various elements regardless of any order and/or degree of importance. Also, such expressions are used only to distinguish one element from another element, and are not intended to limit the elements.

Meanwhile, the description in the disclosure that one element (e.g.: a first element) is "(operatively or communicatively) coupled with/to" or "connected to" another element (e.g.: a second element) should be interpreted to include both the configuration in which the one element is directly coupled to the another element, and the configuration in which the one element is coupled to the another element through still another intervening element (e.g.: a third element).

Also, in the disclosure, "a module" or "a part" performs at least one function or operation, and may be implemented as hardware or software, or as a combination of hardware and software. Further, a plurality of "modules" or "parts" may be integrated into at least one module and implemented as at least one processor, except "modules" or "parts" that need to be implemented as specific hardware. In addition, in this specification, the term "user" may refer to a person who uses an electronic device (an air conditioning device) or a device communicating with or controlling an electronic device (e.g.: an artificial intelligence electronic device).

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

Hereinafter, an embodiment of the disclosure will be described in more detail with reference to the accompanying drawings.

FIG. 1 is a diagram illustrating a method of an air conditioning device removing carbon dioxide from the indoor air environment according to an embodiment of the disclosure.

The air conditioning device 100 according to an embodiment of the disclosure may be implemented as a robot type air purifier that can automatically move a disposition or location within the indoor environment, but this is merely an example. The air conditioning device 100 may be implemented as various electronic devices (e.g., an air conditioner, a humidifier, etc.) including an air purifying function, and thus may be an air purification device.

The air conditioning device 100 may remove carbon dioxide that exists within air of the indoor environment by using a carbon dioxide absorption filter. Specifically, a carbon dioxide absorption filter may be a filter that is implemented with at least one material among zeolite, a metal organic framework (MOF), a covalent organic framework (COF), and a covalent organic polymer (COP), and the coating is processed on the material with at least one of an amine series, KOH, or Li.

In particular, the air conditioning device 100 may acquire information on the concentration of carbon dioxide in the indoor air through an internal or external sensor detecting concentration of carbon dioxide. If the concentration of carbon dioxide in the indoor air is greater than or equal to a threshold concentration, the air conditioning device 100 may be controlled to drive a fan such that the indoor air is forcibly introduced into an air purification part including the carbon dioxide absorption filter. As the air is circulated through the carbon dioxide absorption filter, carbon dioxide included in the indoor air may be removed.

Alternatively, the air conditioning device 100 may acquire information for an indoor area having carbon dioxide having concentration greater than or equal to threshold concentration based on information on the concentration of carbon dioxide received from an external device. If an area in which carbon dioxide having concentration greater than or equal to threshold concentration exists is detected, the air conditioning device 100 may be controlled to move to the area in which carbon dioxide concentration greater than or equal to the threshold concentration exists. Once positioned, the air conditioning device 100 may be controlled drive the fan such that the indoor air in the particular area is introduced into an air purifying part including the carbon dioxide absorption filter, and may remove carbon dioxide included in the indoor air of the particular area through the carbon dioxide absorption filter. Here, an external device may be an Internet of Things (IoT) device that exists in a home, and may be a device including a plurality of sensors (e.g., a temperature sensor, a humidity sensor, a gas sensor, a carbon dioxide detecting sensor, etc.) that can acquire information on an indoor environment inside a home. Alternatively, an external device may be a hub device (or a home gateway device) that collects information on an indoor environment from a plurality of IoT devices that exist in a home.

Alternatively, the air conditioning device 100 may drive the fan based on a user setting or a user's usage pattern, and may remove carbon dioxide included in the indoor air through the carbon dioxide absorption filter. For example, a user established setting may be that carbon dioxide is filtered during the morning hours. According to the setting, the air conditioning device 100 may drive the fan in the morning hours configured by the user, and the air conditioning device 100 may remove carbon dioxide included in the indoor air through the carbon dioxide absorption filter. Alternatively, the air conditioning device 100 may learn a user's usage pattern, and may drive the fan based on the user's usage pattern, and may remove carbon dioxide included in the indoor air through the carbon dioxide absorption filter.

Alternatively, the air conditioning device 100 may remove carbon dioxide that exists indoors based on at least one of information on the current time, the season, or a user's lifestyle. For example, a setting for operation of the air conditioning device 100 may be when the current time is the sleeping hour (e.g., 01:00~02:00). The air conditioning device 100 may remove carbon dioxide that exists indoors for comfortable sleep of a user during the specified hours. Alternatively, carbon dioxide may be removed in different hours according to seasons (e.g., 03:00~04:00 in summer, and 06:00~07:00 in winter). Alternatively, a user may prepare dinner between 06:00~07:00 based on information on the user's lifestyle, and thus the air conditioning device 100 may perform an operation of removing carbon dioxide for air purification during that hour when the user is expected to introduce carbon dioxide into the indoor atmosphere owing to use of an oven or gas in a kitchen.

If it is determined that the concentration of carbon dioxide in the indoor air is less than or equal to a threshold value, the air conditioning device 100 may not operate. If it is determined that the concentration of carbon dioxide in the indoor air is less than or equal to a threshold value, the air conditioning device 100 may stop driving of the fan, and thereby stop the operation for removing carbon dioxide in the indoor air.

The air conditioning device 100 may include a sensor that can detect the amount of carbon dioxide absorbed via the carbon dioxide absorption filter (e.g., both far ends of the carbon dioxide absorption filter), and guide a user about whether to replace the carbon dioxide absorption filter based on the amount of carbon dioxide absorbed into the carbon dioxide absorption filter detected through the sensor. That is, if the amount of carbon dioxide absorbed into the carbon dioxide absorption filter detected through the sensor exceeds a threshold value, the air conditioning device 100 may output a message requesting replacement of the carbon dioxide absorption filter through a display or a speaker. Alternatively, the air conditioning device 100 may include a color changing material that changes according to the amount of carbon dioxide absorbed on the carbon dioxide absorption filter (e.g., triethanolamine-based, polydiacetylene-based, benzobisimidazolium-based, etc.). A user may determine whether to replace the carbon dioxide absorption filter according to the change of the color of the material provided on the carbon dioxide absorption filter.

While carbon dioxide is absorbed into the carbon dioxide absorption filter, the air conditioning device 100 may determine whether ventilation is performed indoors. Specifically, the air conditioning device 100 may acquire information on whether a window is opened from an external device, and determine whether indoor ventilation is performed based on the acquired information. Alternatively, the air conditioning device 100 may acquire an image of an area in which a window is located through a camera included in the air conditioning device 100, and determine whether the window is opened by analyzing the acquired image. Alternatively, the air conditioning device 100 may determine whether a window is opened through various sensors (e.g., a temperature sensor, a humidity sensor, a fine dust sensor, etc.). Here, the air conditioning device 100 may determine an area in which captured carbon dioxide can be ventilated based on location information of the opened window. For example, the opened window may be a window located in the living room, and the air conditioning device 100 may determine the area of the living room window as an area in which carbon dioxide can be ventilated.

If a window is opened and ventilation is performed, the air conditioning device 100 may move to the area at which the window is opened. Specifically, the air conditioning device 100 may move to the area that can support ventilation through the open window using a pre-stored map. Here, the air conditioning device 100 may determine a route having the shortest distance by using the pre-stored map and move to the area in which ventilation is available based on the determined route. Alternatively, while the air conditioning device 100 moves to the area that can be ventilated, the air conditioning device 100 may go through an area in which the concentration of carbon dioxide is greater than or equal to a threshold value based on the concentration of carbon dioxide with respect to a plurality of areas received from an external sensing device and remove carbon dioxide in the area in which the concentration of carbon dioxide is greater than or equal to a threshold value, and then move to the area that can support ventilation of the captured carbon dioxide. Also, if an obstacle is detected by a camera or a sensor while the air conditioning device 100 moves, the air conditioning device 100 may move to the ventilation area while avoiding the obstacle.

In addition, the air conditioning device 100 may transmit a control command to a device that can control opening and closing of a window among external devices. That is, the air conditioning device 100 may transmit a control command to open a window to a device that can control opening and closing of a window, and move to the ventilation area when the window is opened.

Also, the air conditioning device 100 may provide information on a time point when ventilation is possible to a user based on air quality data according to seasons. Specifically, the air conditioning device 100 may provide information on a time point when ventilation is possible according to each season to a user based on air quality data according to a plurality of seasons. In particular, the air conditioning device 100 may determine a time point when air quality is good (e.g., a time point when the amount of fine dust and ultra-fine dust is small or a time point when the concentration of harmful gas such as carbon monoxide is small, etc.) and a time point when air quality is bad (e.g., a time point when the amount of fine dust and ultra-fine dust is large or a time point when the concentration of harmful gas such as carbon monoxide is high, etc.) for each season based on air quality data according to each season, and determine a time point when air quality is good as a time point when ventilation is possible and output such information a user. Here, air quality data with respect to a plurality of seasons may be data learned through data for air quality collected for each season in the past. As a result, the air conditioning device may acquire information on a time point when ventilation is possible for each season and perform ventilation, and the air conditioning device 100 may cycle the carbon dioxide absorption filter more effectively. Also, the air conditioning device 100 may drive the filter reproduction part for removing carbon dioxide absorbed into the carbon dioxide absorption filter in an area that can be ventilated. Here, the filter reproduction part may be a component that is provided around the carbon dioxide absorption filter (e.g., the side surface) and is for removing carbon dioxide absorbed into the carbon dioxide absorption filter by generating heat or light to the carbon dioxide absorption filter. Here, the air conditioning device 100 may drive the filter reproduction part during a predetermined time period (e.g., 1 hour), but this is merely an example, and the air conditioning device 100 may control the driving time according to the amount of carbon dioxide absorbed into the carbon dioxide absorption filter detected through the sensor.

As described above, the air conditioning device 100 may remove carbon dioxide absorbed into the carbon dioxide absorption filter in an area that can support ventilation, and may thereby discharge carbon dioxide from the internal atmosphere to the external outside atmosphere. Also, the air conditioning device 100 may remove carbon dioxide trapped by the carbon dioxide absorption filter, and may thereby discharge the carbon dioxide to then remove carbon dioxide that exists in another area.

In addition, the air conditioning device 100 may not drive the filter reproduction part, but control the carbon dioxide absorption filter based on heat or light provided from the outside according to the current temperature, weather, and season. Specifically, in a configuration that the current temperature is a temperature greater than or equal to a first threshold value, the air conditioning device 100 may move to an area in which sunlight is introduced so that carbon dioxide can be ventilated to remove carbon dioxide absorbed into the carbon dioxide absorption filter by using solar heat. Alternatively, in a configuration that the current temperature is a temperature less than or equal to a second threshold value, the air conditioning device 100 may control the filter reproduction part to remove carbon dioxide absorbed into the carbon dioxide absorption filter by generating heat or light. In a configuration in which sunlight is detected, the air conditioning device 100 may move to an area of the sunlight for removing carbon dioxide absorbed into the carbon dioxide absorption filter by using sunlight and solar heat. Meanwhile, if an external environment is cloudy or sunlight is not detected, the air conditioning device 100 may control the filter reproduction part to remove carbon dioxide absorbed into the carbon dioxide absorption filter by generating heat or light. Also, if the current season is summer, the air conditioning device 100 may move to an area in which sunlight is introduced so that carbon dioxide can be ventilated for removing carbon dioxide absorbed into the carbon dioxide absorption filter by using solar heat. Meanwhile, if the current weather is winter, the air conditioning device 100 may control the filter reproduction part to remove carbon dioxide absorbed into the carbon dioxide absorption filter by generating heat or light.

Also, the air conditioning device 100 may learn a user's usage pattern, and move to an area that can support ventilation and cycle the carbon dioxide absorption filter. That is, if it is learned that a user performs ventilation during specific hours, the air conditioning device 100 may move to an area that can support ventilation during the learned hours, and cycle the carbon dioxide absorption filter to discharge the trapped carbon dioxide.

Figure 2:
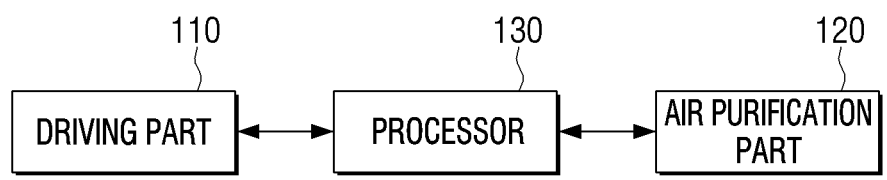
FIG. 2 is a block diagram illustrating a schematic configuration of an air conditioning device according to an embodiment of the disclosure.
Figure 3:
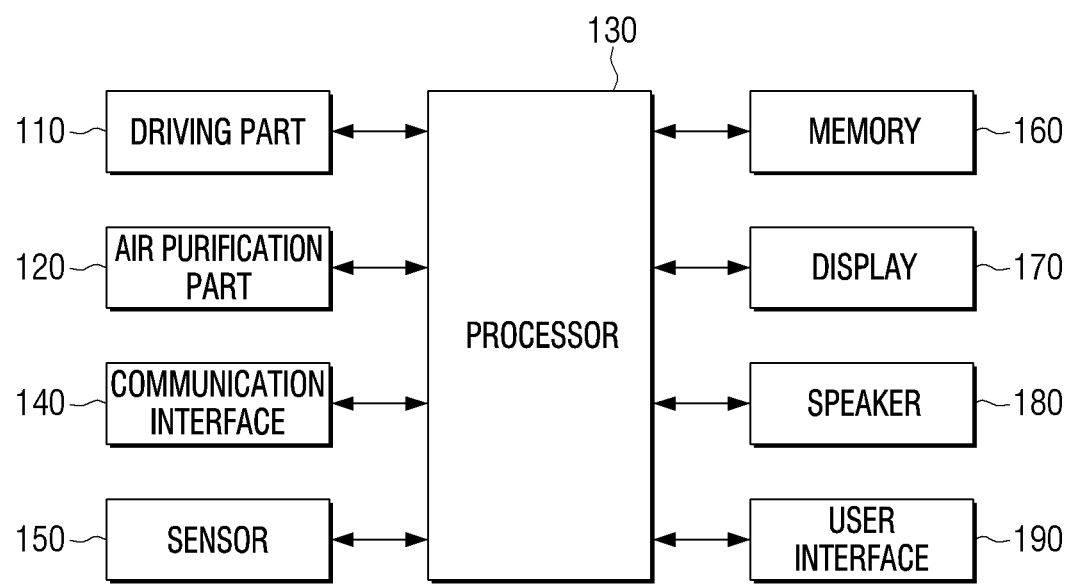
FIG. 3 is a block diagram illustrating a detailed configuration of an air conditioning device according to an embodiment of the disclosure.

FIGS. 2 and 3 are block diagrams illustrating a configuration of an air conditioning device according to an embodiment of the disclosure. As illustrated in FIG. 2, the air conditioning device 100 includes a driving part 110, an air purification part 120, and a processor 130. However, the components of the air conditioning device 100 are not limited to the aforementioned components, and some components can be added or omitted according to the type of the air conditioning device 100.

The driving part 110 is a component moving the air conditioning device 100, and may include a motor and a plurality of wheels. The driving part 110 may move the air conditioning device 100 to a space in which the concentration of carbon dioxide is greater than or equal to threshold concentration or an area that can support ventilation or an area in which sunlight is introduced according to control of the processor 130.

The air purification part 120 is a component performing a function of filtering the air and discharging the filtered air. The air purification part 120 may include a fan for drawing external air towards the air purification part 120 and expelling filtered air, and an air purification filter for purifying air. Here, the air purification filter is a component filtering the absorbed air, and may include, for example, a pre-filter, a functional filter, a hepa filter, a deodorization filter, a carbon dioxide absorption filter, etc. Also, the air purification part 120 may include a filter reproduction part cleaning or cycling the carbon dioxide absorption filter by generating heat or light for removing carbon dioxide absorbed into the carbon dioxide absorption filter. Detailed explanation regarding the air purification part 120 will be made later with reference to FIG. 4A and FIG. 4B.

The processor 130 may control the overall operations of the air conditioning device. The processor 130 may be implemented as a digital signal processor (DSP) processing digital signals, a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP) or a communication processor (CP), and an ARM processor, or may be defined by the terms. Also, the processor 130 may be implemented as a system on chip (SoC) having a processing algorithm stored therein or large scale integration (LSI), or in the form of a field programmable gate array (FPGA). The processor 130 may perform various functions by loading and executing computer executable instructions stored in and read from the memory 160.

In particular, the processor 130 may control the air purification part 120 to remove carbon dioxide that exists indoors. The processor 130 may also control the driving part 110 such that the air conditioning device 100 moves to an area that can support ventilation, and drive the filter reproduction part for removing carbon dioxide absorbed into the carbon dioxide absorption filter in the area that can support ventilation. That is, the processor 130 may drive the filter reproduction part to generate heat or light for removing carbon dioxide absorbed into the carbon dioxide absorption filter.

Specifically, if the concentration of carbon dioxide detected through a sensor provided in the air conditioning device 100 is greater than or equal to the threshold concentration, the processor 130 may control the air purification part 120 to remove carbon dioxide in the area in which carbon dioxide having concentration greater than or equal to the threshold concentration exists. Also, if the concentration of carbon dioxide detected through the sensor is greater than or equal to the threshold concentration, the processor 130 may transmit at least one of information on the detected carbon dioxide and information guiding driving of the air purification part 120 to an external device.

In addition, the processor 130 may receive sensing information for carbon dioxide from an external device, and if an area in which carbon dioxide having concentration greater than or equal to the threshold concentration exists is detected based on sensing information for carbon dioxide, the processor 130 may control the driving part 110 to move the air conditioning device 100 to the area in which carbon dioxide having concentration greater than or equal to the threshold concentration exists, and may control the air purification part 120 to remove carbon dioxide in the area in which carbon dioxide having concentration greater than or equal to the threshold concentration exists.

Further, the processor 130 may control the air purification part 120 to remove carbon dioxide that exists indoors based on at least one of information on the current time, the season, or a user's lifestyle.

Also, the processor 130 may provide information on a time point when ventilation is possible based on air quality data according to seasons. Specifically, the processor 130 may provide information on the most appropriate time point when ventilation is possible for each of spring, summer, fall, and winter to a user based on pre-learned air quality data according to seasons.

In addition, the processor 130 may determine whether indoor ventilation will proceed and an area that can support ventilation based on information received from a sensing device attached to at least one of a window or a door. Specifically, the processor 130 may acquire information on opening and closing of a window from an external sensing device attached to a window or a door, or attached around a window or a door, and determine whether indoor ventilation will proceed and an area that can support ventilation based on the acquired information.

Further, the processor 130 may remove carbon dioxide absorbed into the carbon dioxide filter by different methods based on information on the current temperature or information on the weather. Specifically, if the current temperature is a temperature greater than or equal to a first threshold value, the processor 130 may control the driving part 110 to move to an area in which sunlight is introduced in the area for removing carbon dioxide absorbed into the carbon dioxide absorption filter by using solar heat. Alternatively, if the current temperature is a temperature less than or equal to a second threshold value, the processor 130 may drive the filter reproduction part to generate heat or light, and thereby remove carbon dioxide absorbed into the carbon dioxide absorption filter. Also, if external ambient sunlight is sufficiently available, the processor 130 may control the driving part 110 to move to an area in which sunlight is available for removing carbon dioxide absorbed into the carbon dioxide absorption filter by using sunlight and solar heat. Meanwhile, if external ambient sunlight is not sufficiently available for discharging trapped carbon dioxide, the processor 130 may drive the filter reproduction part to generate heat or light and thereby remove carbon dioxide absorbed into the carbon dioxide absorption filter.

FIG. 3 is a block diagram illustrating a detailed configuration of an air conditioning device according to an embodiment of the disclosure. As illustrated in FIG. 3, the air conditioning device 100 includes a driving part 110, an air purification part 120, a communication interface 140, a sensor 150, a memory 160, a display 170, a speaker 180, a user interface 190, and a processor 130. Regarding components that overlap with the components illustrated in FIG. 2 among the components illustrated in FIG. 3, redundant explanations are omitted.

The communication interface 140 may perform communication with an external device. Meanwhile, connection of communication between the communication interface 140 and an external device may include communication through a third device (e.g., a repeater, a hub, an access point, a server, or a gateway). Wireless communication may include, for example, cellular communication using at least one of LTE, LTE Advance (LTE-A), code division multiple access (CDMA), wideband CDMA (WCDMA), a universal mobile telecommunications system (UMTS), Wireless Broadband (WiBro), or a Global System for Mobile Communications (GSM). According to an embodiment, wireless communication may include, for example, at least one of wireless fidelity (WiFi), Bluetooth, Bluetooth low energy (BLE), Zigbee, near field communication (NFC), Magnetic Secure Transmission, radio frequency (RF), or a body area network (BAN). Wired communication may include, for example, at least one of a universal serial bus (USB), a high definition multimedia interface (HDMI), a recommended standard 232 (RS-232), power line communication, or a plain old telephone service (POTS). Networks in which wireless communication or wired communication is performed may include at least one of a telecommunication network, for example, a computer network (e.g.: an LAN or a WAN), Internet, or a telephone network.

In particular, the communication interface 140 may provide various information (e.g., information on the concentration of carbon dioxide, information on operations performed by the air conditioning device) to an external electronic device, and acquire various information (e.g., information on the concentration of carbon dioxide, information on opening and closing of a window, information on an area that can support ventilation, etc.) from an external device.

The sensor 150 may sense various information around the air conditioning device 100. In particular, the sensor 150 is a sensor for acquiring information on the indoor air, and may include a sensor that can detect the concentration of carbon dioxide. The sensor 150 may include various sensors such as a sensor for detecting the concentration of fine dust, a sensor for detecting other types of gas (e.g. water vapor, carbon monoxide, oxygen), etc. Also, the sensor 150 may include an image sensor (or a camera) for photographing the outside of the air conditioning device 100.

The memory 160 may store instructions or data related to at least one other component of the air conditioning device 100. In particular, the memory 160 may be implemented as a non-volatile memory, a volatile memory, a flash-memory, a hard disc drive (HDD) or a solid state drive (SSD), etc. Further, the memory 160 may be accessed by the processor 130, and reading/recording/correcting/deleting/updating, etc. of data by the processor 130 may be performed. Meanwhile, in the disclosure, the term memory may include a memory 160, a ROM inside the processor 130, a RAM, or a memory card (e.g., a micro SD card, a memory stick) installed on the air conditioning device 100. Also, in the memory 160, programs and data, etc. for constituting various kinds of screens to be displayed in a display area of a display may be stored.

Also, the memory 160 may store an artificial intelligence model for learning a user's usage pattern, a user's lifestyle pattern, etc. based on various kinds of information. In addition, the memory 160 may store an artificial intelligence agent for training or driving an artificial intelligence model. Here, the artificial intelligence agent may be executed by a conventional generic-purpose processor (e.g., a CPU) or a separate AI-dedicated processor (e.g., a GPU, an NPU, etc.).

Figure 8A:
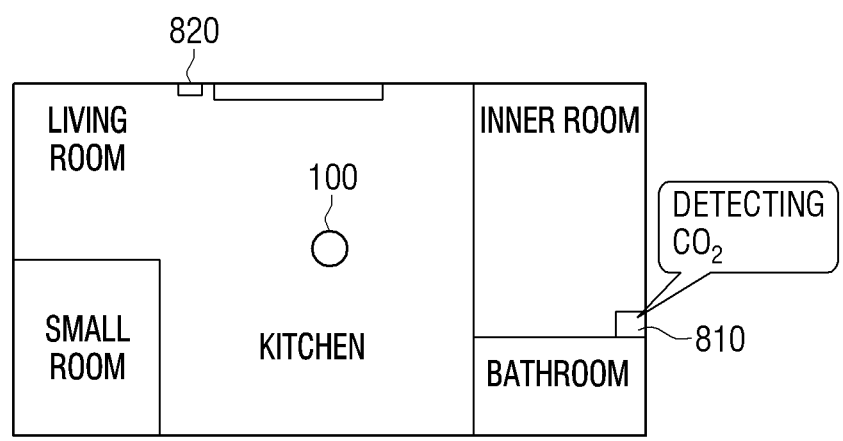
FIG. 8A is a diagram illustrating a method for an air conditioning device to remove carbon dioxide according to an embodiment of the disclosure.

Further, the memory 160 may store map information for the space in which the air conditioning device 100 is currently located. For example, the space in which the air conditioning device 100 is located is a home, and the memory 160 may store map information as illustrated in FIG. 8A. Here, map information may be received from an external device (e.g., a home gateway device or a user terminal device), directly input from a user, or learned from positioning of the air conditioning device 100.

The display 170 may display various kinds of information according to control of the processor 130. In particular, the display 170 may display information on the concentration of carbon dioxide in the current indoor air or information on the operation that the air conditioning device 100 is currently performing. Meanwhile, the display 170 may be implemented as a touch screen together with a touch panel included in the user interface 190.

The speaker 180 is a component that outputs various audio data for decoding, amplification, or noise filtering performed by an audio processor, and also outputs various notification sounds or voice messages. In particular, the speaker 180 may output information on the concentration of carbon dioxide in the current indoor air or information on the operation that the air conditioning device 100 is currently performing as a voice message in the form of a natural language. Meanwhile, a component for outputting audio may be implemented as a speaker, but this is merely an example, and the component may be implemented as an output terminal that can output audio data.

The user interface 190 may receive a user input for controlling the air conditioning device 100. In particular, in the user interface 190, a touch panel for receiving input of a user touch by a user's hand or by using a stylus pen, etc., a button for receiving input of a user manipulation, etc. may be included. Other than the above, the user interface 190 may be implemented as other input devices (e.g., a keyboard, a mouse, a motion inputter, etc.).

Figure 4A:
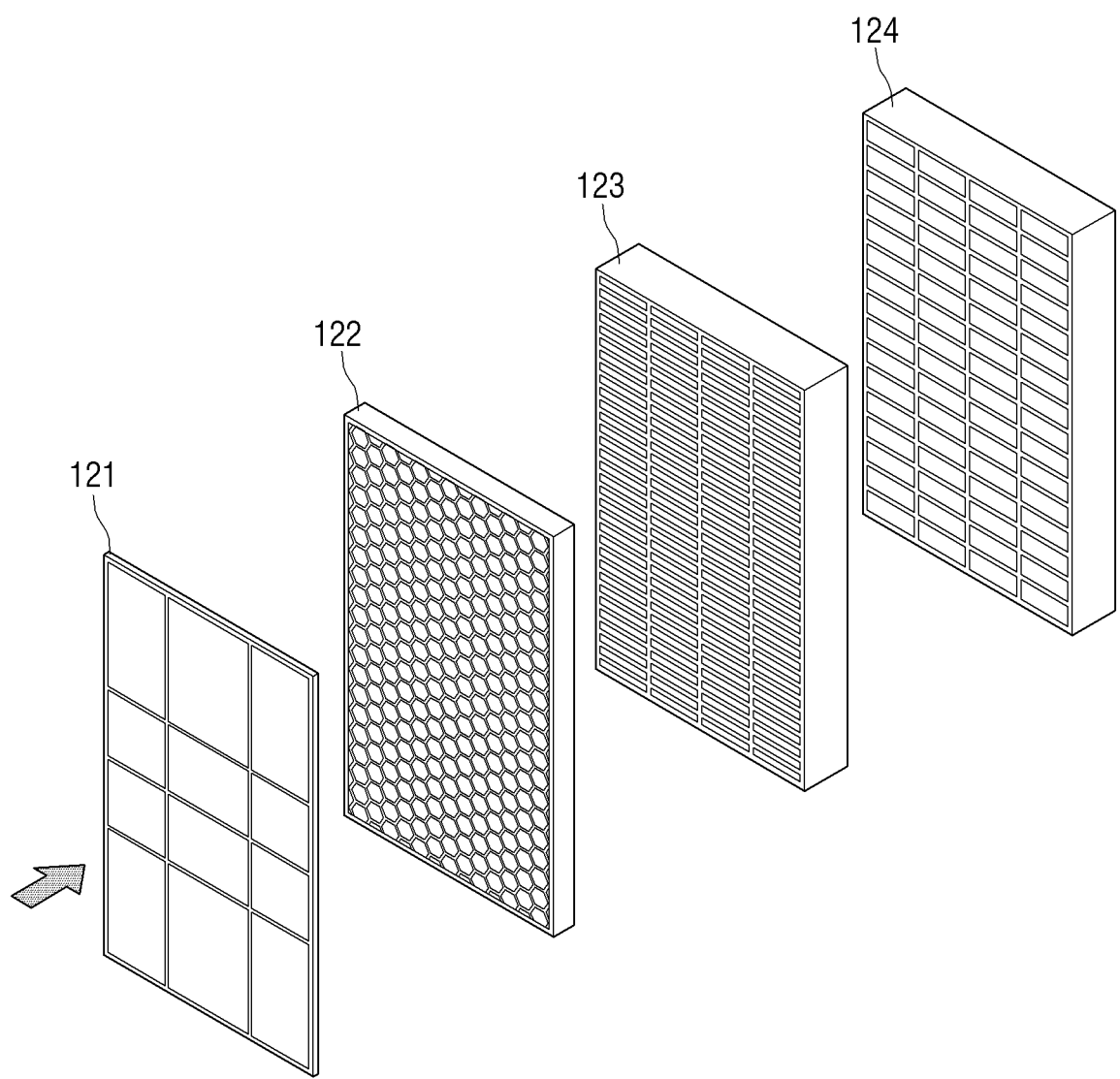
FIG. 4A is a diagram illustrating an air purification part according to an embodiment of the disclosure.
Figure 4B:
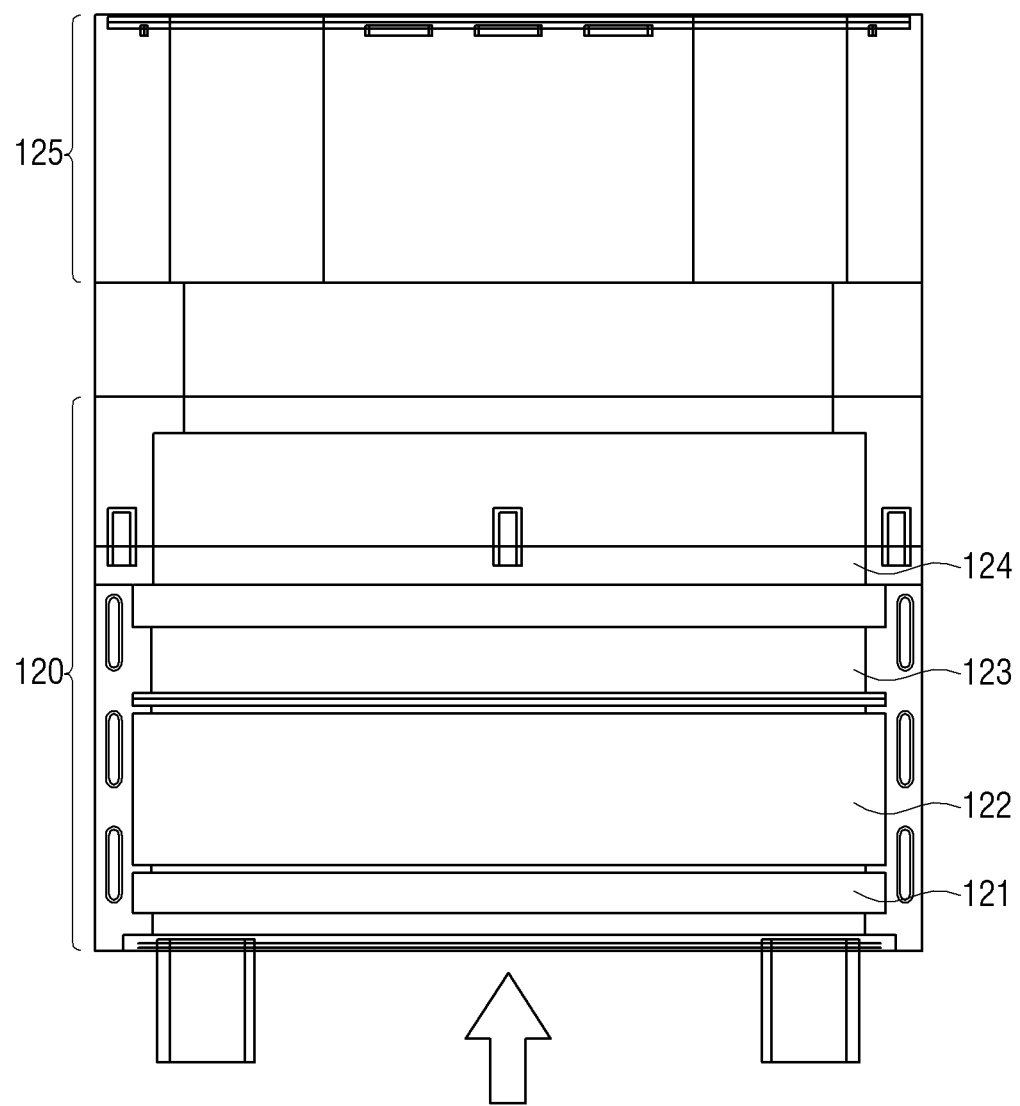
FIG. 4B is a diagram illustrating an air purification part according to an embodiment of the disclosure.

FIG. 4A and FIG. 4B are diagrams for illustrating an air purification part according to an embodiment of the disclosure.

As illustrated in FIG. 4A, the air purification part 120 may include a pre-filter 121, a deodorization filter 122, a hepa filter 123, and a carbon dioxide absorption filter 124. Here, the pre-filter 121 may be a filter for removing dust in the indoor air, the deodorization filter 122 may be a filter for removing various kinds of odor and harmful gases in the indoor air, the hepa filter 123 may be a filter for removing fine dust in the indoor air, and the carbon dioxide absorption filter 124 may be a filter for removing carbon dioxide in the indoor air. Here, the carbon dioxide absorption filter may be a filter that is implemented with at least one material among zeolite, a metal organic framework (MOF), a covalent organic framework (COF), and a covalent organic polymer (COP), and the coating is processed on the material with at least one of an amine series, KOH, or Li.

Also, the air purification part 120 may include a filter reproduction part for cleaning the carbon dioxide absorption filter 124. The filter reproduction part may be provided around the carbon dioxide absorption filter (e.g., the side surface of the carbon dioxide absorption filter or the upper part of the carbon dioxide absorption filter) for discharging carbon dioxide absorbed into the carbon dioxide absorption filter 124, and apply heat or light to the carbon dioxide absorption filter. Here, the filter reproduction part may be implemented as components such as a light-emitting diode (LED), a lamp, a heater, etc.

Here, the pre-filter 121, the deodorization filter 122, the hepa filter 123, and the carbon dioxide absorption filter 124 may be arranged in an order of filtering larger to smaller particle sizes based on the direction in that air is flowing therethrough for removing dust or harmful gases. For example, as illustrated in FIG. 4A, air is filtered from the left side to the right side, in the air purification part 120, the filters may be arranged in the order of the pre-filter 121, the deodorization filter 122, the hepa filter 123, and the carbon dioxide absorption filter 124. As another example, as illustrated in FIG. 4B, air is flowing from the bottom to the upper side, and in the air purification part 120, the filters may be arranged in the order of the pre-filter 121, the deodorization filter 122, the hepa filter 123, and the carbon dioxide absorption filter 124. Here, the filter reproduction part may be located in the upper end portion of the carbon dioxide absorption filter 124, and the fan 125 may be located in the uppermost end portion of the air conditioning device 100.

Figure 5:
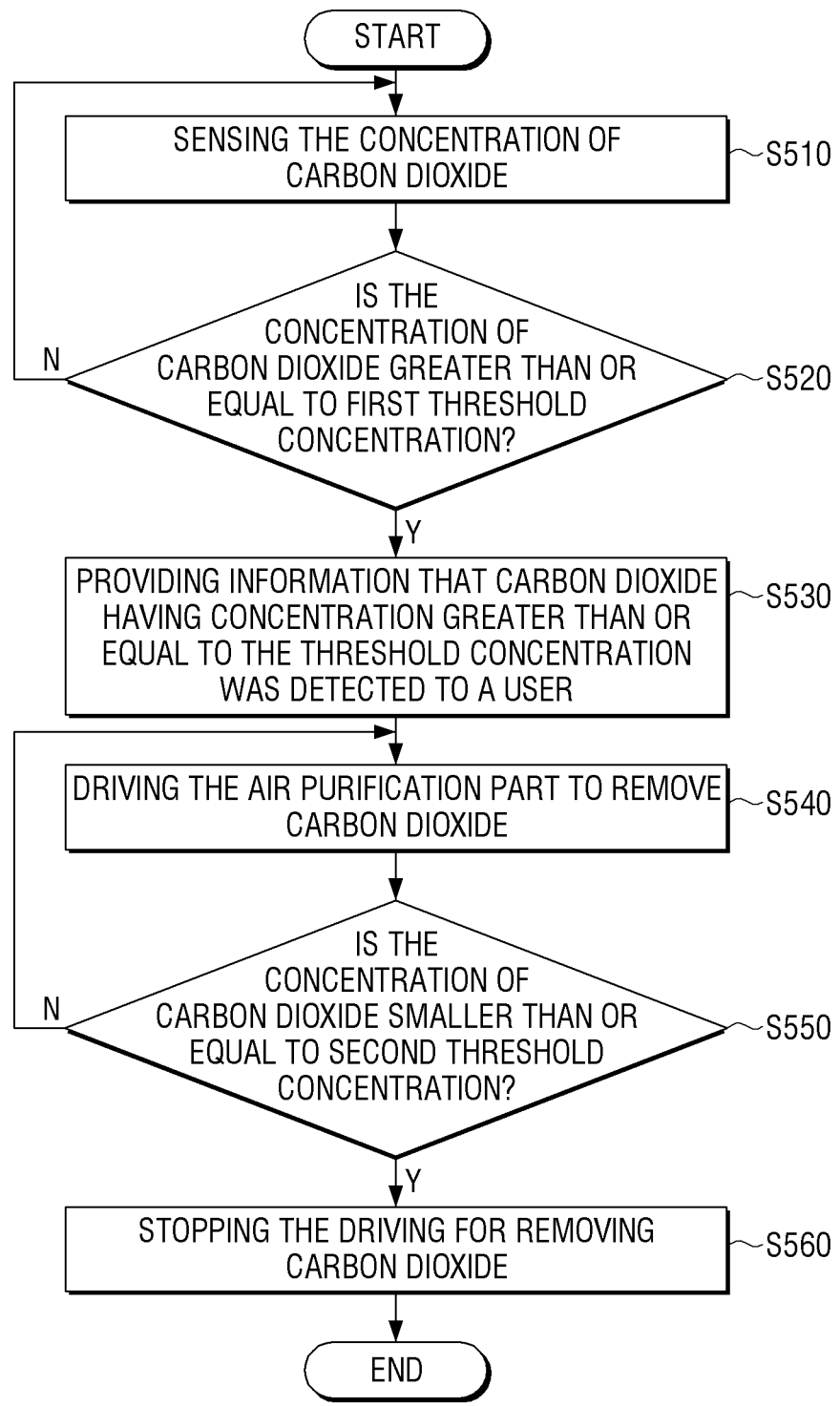
FIG. 5 is a flowchart illustrating a method of removing carbon dioxide in the indoor air according to an embodiment of the disclosure.

FIG. 5 is a diagram for illustrating a method of removing carbon dioxide in the indoor air according to an embodiment of the disclosure.

First, the air conditioning device 100 may sense the concentration of carbon dioxide at operation S510. Specifically, the air conditioning device 100 may sense the concentration of carbon dioxide included in the indoor air through the sensor. The sensor may be an internal sensor or an external sensor that transmits the concentration to the air conditioning device 100.

Then, the air conditioning device 100 may determine whether the sensed concentration of carbon dioxide is greater than or equal to the first threshold concentration at operation S520. For example, the air conditioning device 100 may determine whether the sensed concentration of carbon dioxide is greater than or equal to 1000 ppm.

If the sensed concentration of carbon dioxide is greater than or equal to the first threshold concentration at operation S520-Y, the air conditioning device 100 may provide information that carbon dioxide having concentration greater than or equal to the threshold concentration was detected to the user at operation S530. Here, the air conditioning device 100 may provide the information that carbon dioxide having concentration greater than or equal to the threshold concentration was detected through the display 170 or the speaker 180, and provide the information that carbon dioxide having concentration greater than or equal to the threshold concentration was detected to the user terminal through the communication interface 140. Here, the user terminal may itself provide the received information visually and acoustically. Specifically, the user terminal may provide the received information that carbon dioxide having concentration greater than or equal to the threshold concentration was detected through the display or the speaker. By virtue of this, even if the user is not in a nearby vicinity of the air conditioning device 100, the user can be informed that carbon dioxide having concentration greater than or equal to the threshold concentration is detected through the user terminal.

The air conditioning device 100 may drive the air purification part 120 for removing carbon dioxide at operation S540. That is, the air conditioning device 100 may drive the fan 125 for removing carbon dioxide in the area in which the concentration of carbon dioxide is greater than or equal to the first threshold concentration.

Also, the air conditioning device 100 may determine whether the sensed concentration of carbon dioxide is less than the second threshold concentration at operation S550. Here, the first threshold concentration may be identical to the second threshold concentration, but this is merely an example, and the second threshold concentration may be less than the first threshold concentration such as 700 ppm.

If it is determined that the concentration of carbon dioxide is less than the second threshold concentration at operation S550-Y, the air conditioning device 100 may stop the operation for removing carbon dioxide at operation S560. That is, the air conditioning device 100 may stop the driving of the fan 125.

Meanwhile, in the aforementioned embodiment, it was described that, in configuration carbon dioxide having concentration less than the second threshold concentration is detected, the driving for removing carbon dioxide may be stopped, but this is merely an example, and the fan may operate during a predetermined time period (e.g., 1 minute, etc.), and then be stopped.

Figure 6:
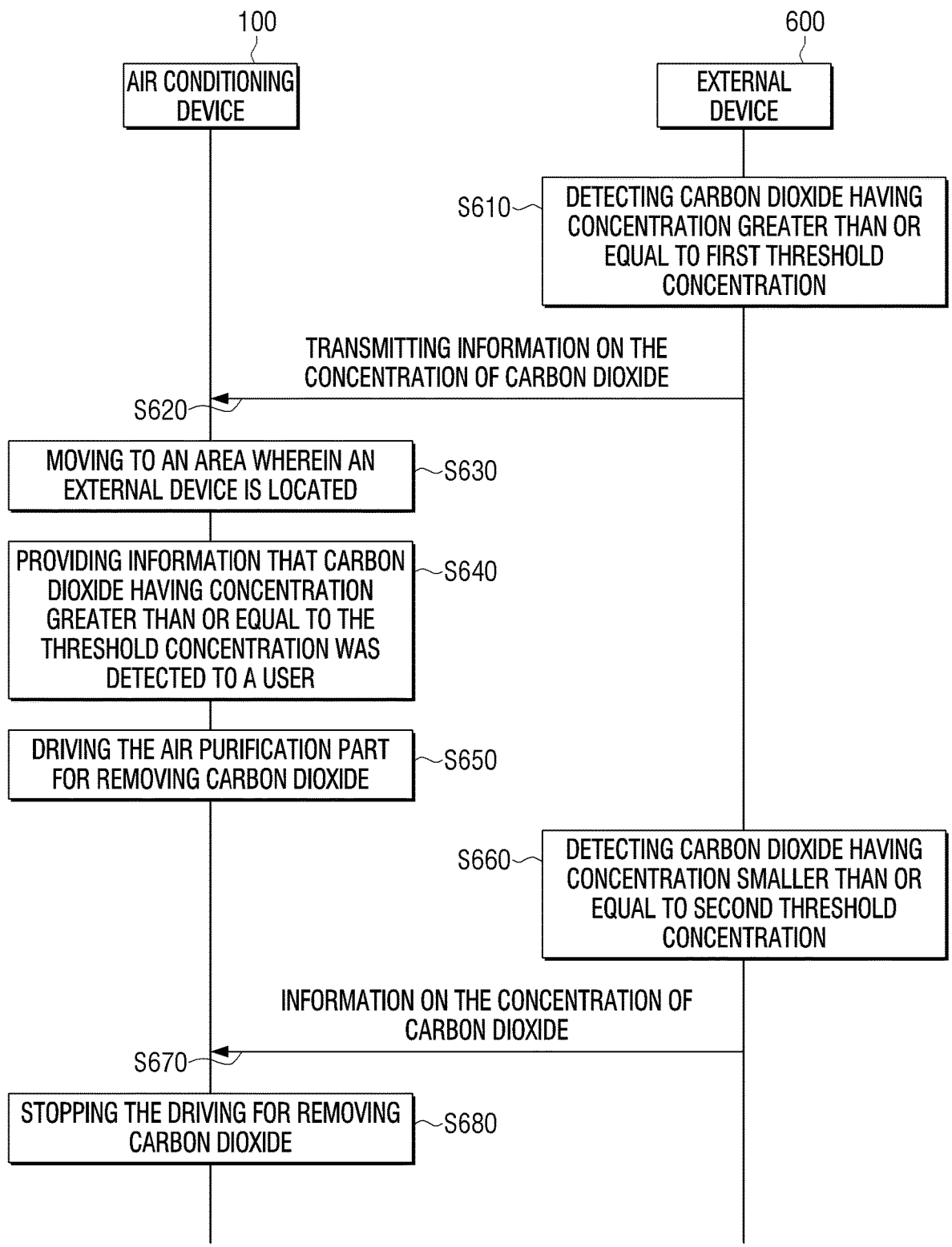
FIG. 6 is a flowchart illustrating a method of removing carbon dioxide from the indoor air according to another embodiment of the disclosure.

FIG. 6 is a flowchart illustrating a method of removing carbon dioxide from the indoor air according to another embodiment of the disclosure.

First, the external device 600 may detect carbon dioxide having concentration greater than or equal to the first threshold concentration in the area in which the external device 600 is located at operation S610. Here, the external device 600 may be one or more sensors or other IoT devices provided in a plurality of different locations in a home. For example, the external device 600 may be provided in the living room, the dining room, the bathroom, the kitchen, the basement, etc.

The external device 600 may transmit information on the concentration of carbon dioxide to the air conditioning device 100 at operation S620. Here, the external device 600 may transmit information on the concentration of carbon dioxide and also information identifying the external device 600.

The air conditioning device 100 may move to the area in which the external device 600 is located based on information on the concentration of carbon dioxide and the information identifying the external device 600 at operation S630.

Also, the air conditioning device 100 may provide information that carbon dioxide having concentration greater than or equal to the threshold concentration was detected to the user at operation S640. Here, the air conditioning device 100 may provide information that carbon dioxide having concentration greater than or equal to the threshold concentration was detected and information on the area in which the external device 600 is located through the display 170 or the speaker 180, and provide information that carbon dioxide having concentration greater than or equal to the threshold concentration was detected and information on the area in which the external device 600 is located to the user terminal through the communication interface 140.

The air conditioning device 100 may drive the air purification part 120 for removing carbon dioxide at operation S650. That is, the air conditioning device 100 may drive the fan 125 for removing carbon dioxide in the area in which the concentration of carbon dioxide is greater than or equal to the first threshold concentration, i.e., the area in which the external device 600 is moved to be located.

While the air conditioning device 100 removes carbon dioxide, the external device 600 may detect carbon dioxide having concentration less than the second threshold concentration at operation S660. Here, the first threshold concentration may be identical to the second threshold concentration, but this is merely an example, and the second threshold concentration may be less than the first threshold concentration such as 700 ppm.

The external device 600 may transmit information on the concentration of carbon dioxide to the air conditioning device 100 at operation S670. Then, the air conditioning device 100 may stop the driving for removing carbon dioxide at operation S680. That is, the air conditioning device 100 may stop the driving of the fan 125.

Figure 7:
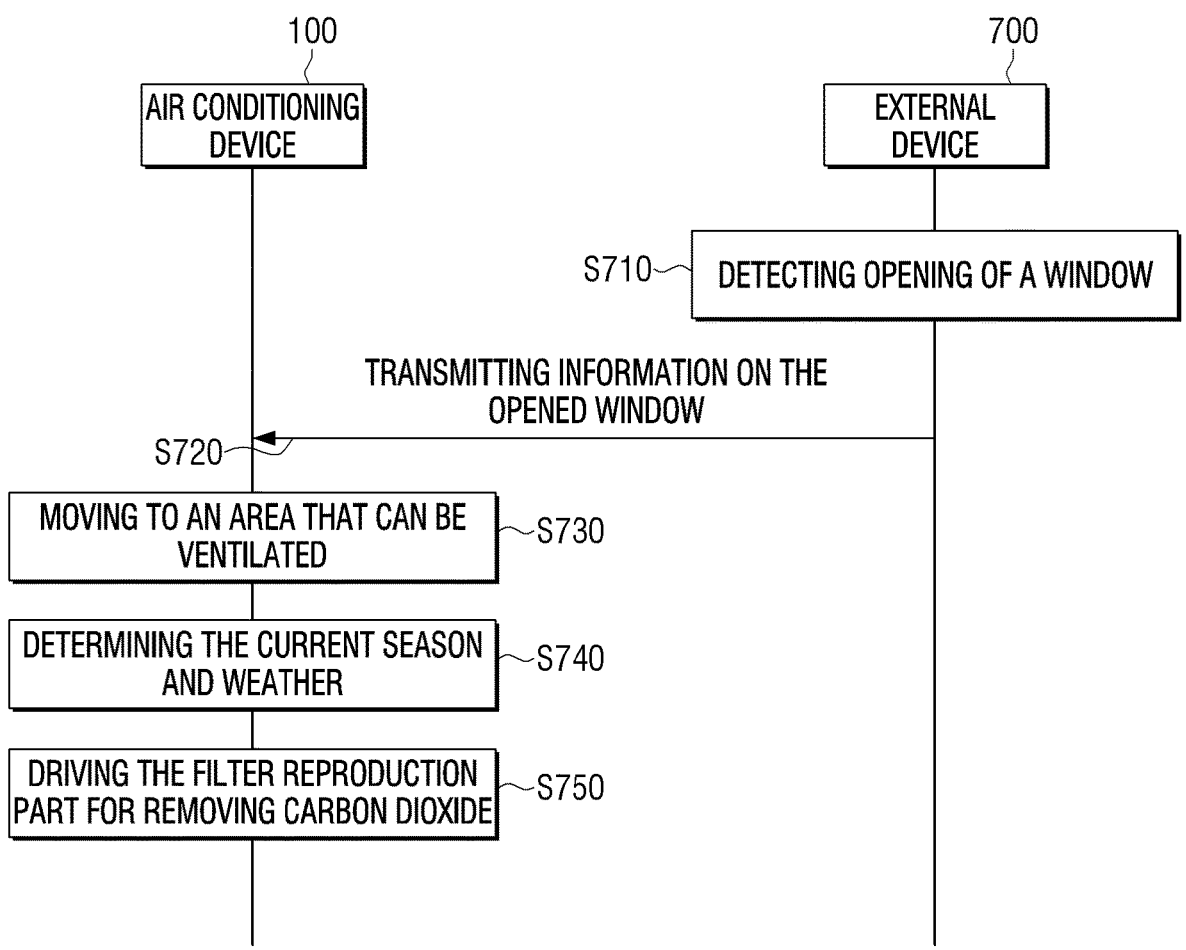
FIG. 7 is a flowchart illustrating a method of discharging carbon dioxide absorbed into the carbon dioxide absorption filter according to an embodiment of the disclosure.

FIG. 7 is a flowchart illustrating a method of discharging carbon dioxide absorbed into the carbon dioxide absorption filter according to an embodiment of the disclosure.

First, the external device 700 may detect opening of a window at operation S710. Here, the external device 700 may detect opening of a window through various sensors (e.g., a temperature sensor, a humidity sensor, a fine dust sensor, etc.), and may also detect opening of a window through analysis of an image photographed through a camera.

Then, the external device 700 may transmit information on opening of a window to the air conditioning device 100 at operation S720. Here, the external device 700 may transmit location information of the opened window or location information of the external device 700.

The air conditioning device 100 may move to an area that can support ventilation based on information received from the external device 700 at operation S730. That is, the air conditioning device 100 may move to an area that can support ventilation for removing carbon dioxide absorbed into the carbon dioxide absorption filter 124. Here, the air conditioning device 100 may move to the area at which a window is opened by using a pre-stored map with reference to the location information of the opened window or location information of the external device 700. Specifically, the air conditioning device 100 may determine a route having the shortest distance to the opened window or location of the external device 700 by using a pre-stored map and move to the area based on the determined route. Alternatively, while the air conditioning device 100 moves to the area for ventilation, the air conditioning device 100 may go through an area in which the concentration of carbon dioxide is greater than or equal to a threshold value based on the concentration of carbon dioxide with respect to a plurality of areas received from an external sensing device and remove carbon dioxide in the area, while moving to the ventilation area and move to the ventilation area. For example, if the air conditioning device is currently located in the inner room and the area that can support ventilation is the living room and the area in which the concentration of carbon dioxide is greater than or equal to a threshold value is the kitchen, the air conditioning device 100 may move from the inner room to the kitchen and drive the fan to remove carbon dioxide that exists in the kitchen by using the carbon dioxide absorption filter, and move from the kitchen to the living room and remove carbon dioxide absorbed into the carbon dioxide absorption filter.

Also, the air conditioning device 100 may determine the current season and weather at operation S740. That is, the air conditioning device 100 may determine whether the current season is summer or winter, whether the current weather is sunny or cloudy, and whether the temperature is higher than or equal to the threshold temperature (e.g., 25 degrees), etc.

The air conditioning device 100 may drive the air purification part 120 for removing carbon dioxide based on the determined current season and weather. For example, if the current season is not summer, or the current weather is cloudy, or the temperature is lower than or equal to the threshold temperature, the air conditioning device 100 may drive the air purification part 120 for removing carbon dioxide absorbed into the carbon dioxide absorption filter. That is, the air conditioning device 100 may drive the air purification part 120 and apply heat or light to the carbon dioxide absorption filter and thereby remove carbon dioxide. Also, the removed carbon dioxide may be discharged to the outside through an open window, door, or location at which discharge may occur to exhaust carbon dioxide to the external atmosphere. Meanwhile, if the current season is summer, the weather is sunny, or the temperature is higher than the threshold temperature, the air conditioning device 100 may remove carbon dioxide absorbed into the carbon dioxide absorption filter by using sunlight and solar heat introduced from the ambient environment.

Meanwhile, in the aforementioned embodiment, it was described that the air conditioning device 100 determines whether ventilation will proceed and an area that can support ventilation based on information received from an external device. However, this is merely an example, and the air conditioning device 100 may determine whether ventilation will proceed and an area that can support ventilation directly by using a camera or a sensor. Specifically, the air conditioning device 100 may photograph an area in which a window photographed by using a camera is included, and analyze the photographed image and determine whether ventilation will proceed upon determining an area that can support ventilation. Alternatively, the air conditioning device 100 may determine whether ventilation will proceed and an area that can support ventilation by using sensing information collected based on various kinds of sensors (e.g., a temperature sensor, a humidity sensor, a wind sensor, etc.). Specifically, while the air conditioning device 100 moves, the air conditioning device 100 may collect sensing information through a plurality of sensors, and if a predetermined change is detected in the collected sensing information, the air conditioning device 100 may determine the area in which a predetermined change was detected as an area that can support ventilation.

FIGS. 8A to 8D are diagrams for illustrating a method for an air conditioning device to remove carbon dioxide according to an embodiment of the disclosure.

The air conditioning device 100 may be located in the living room, as illustrated in FIG. 8A. Here, the first sensing device 810 located in the inner room may detect that the concentration of carbon dioxide in the inner room is greater than or equal to the threshold concentration. Also, the first sensing device 810 may transmit information on the concentration of carbon dioxide in the inner room to the air conditioning device 100.

Figure 8B:
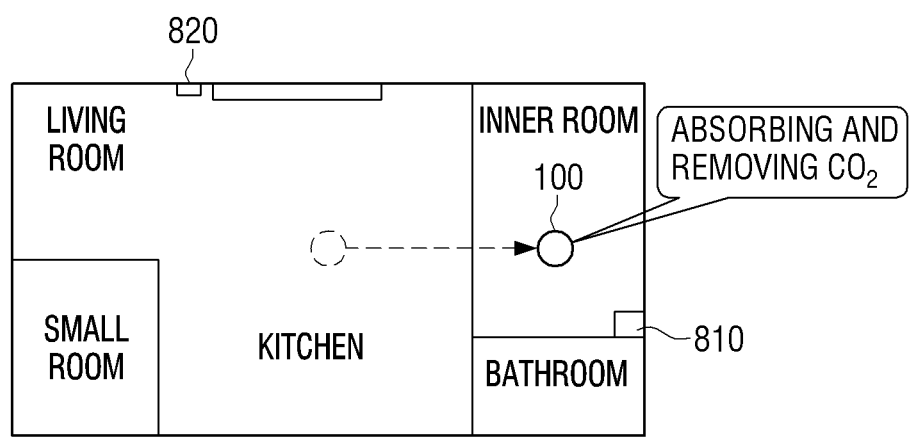
FIG. 8B is a diagram illustrating a method for an air conditioning device to remove carbon dioxide according to an embodiment of the disclosure.

The air conditioning device 100 may move to the inner room by using the driving part 110 as illustrated in FIG. 8B, based on information received from the first sensing device 810, and absorb carbon dioxide by using the carbon dioxide absorption filter in the inner room and remove the carbon dioxide. Here, the air conditioning device 100 may move to the inner room by a shortest distance by using a pre-stored map.

Figure 8C:
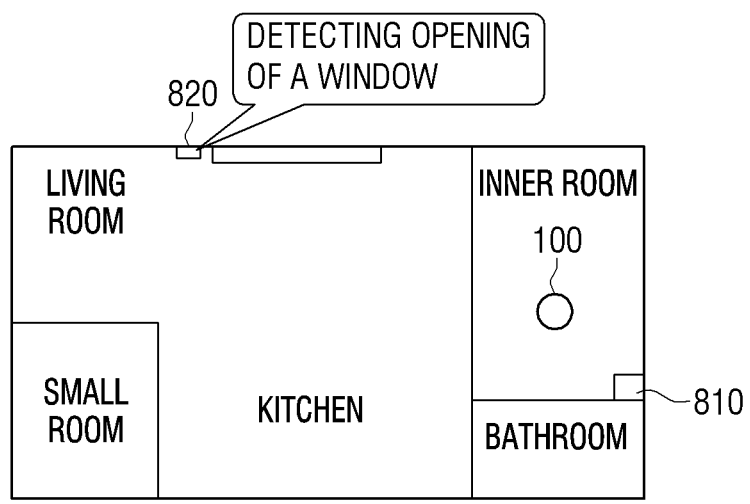
FIG. 8C is a diagram illustrating a method for an air conditioning device to remove carbon dioxide according to an embodiment of the disclosure.

After carbon dioxide that exists in the inner room is absorbed by using the carbon dioxide absorption filter, the second sensing device 820 may detect that a window located in the living room is opened, as illustrated in FIG. 8C. Then, the second sensing device 820 may transmit information on opening of the window to the air conditioning device 100.

Figure 8D:
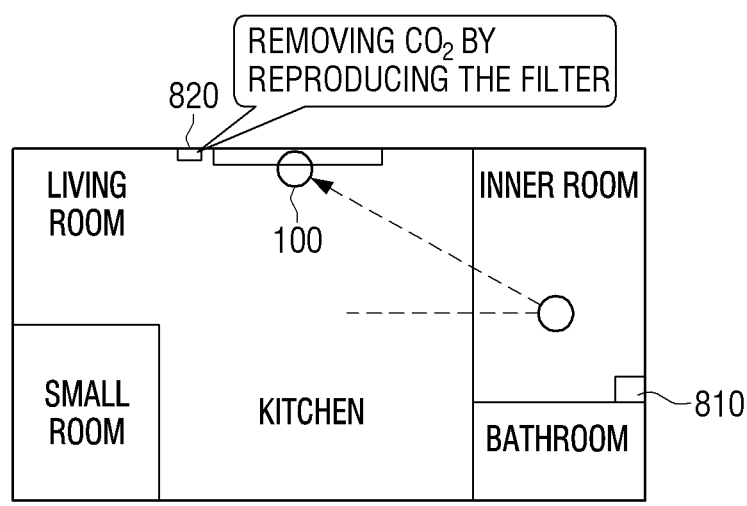
FIG. 8D is a diagram illustrating a method for an air conditioning device to remove carbon dioxide according to an embodiment of the disclosure.

The air conditioning device 100 may move to the area at which the window in the living room is located as illustrated in FIG. 8D, based on the received information on opening of the window, and dispense carbon dioxide from the carbon dioxide absorption filter in the area of the open window. Specifically, the air conditioning device 100 may move to the area at which the window in the living room is located, and drive the filter reproduction part and reproduce the carbon dioxide absorption filter by generating light or heat.

Figure 9:
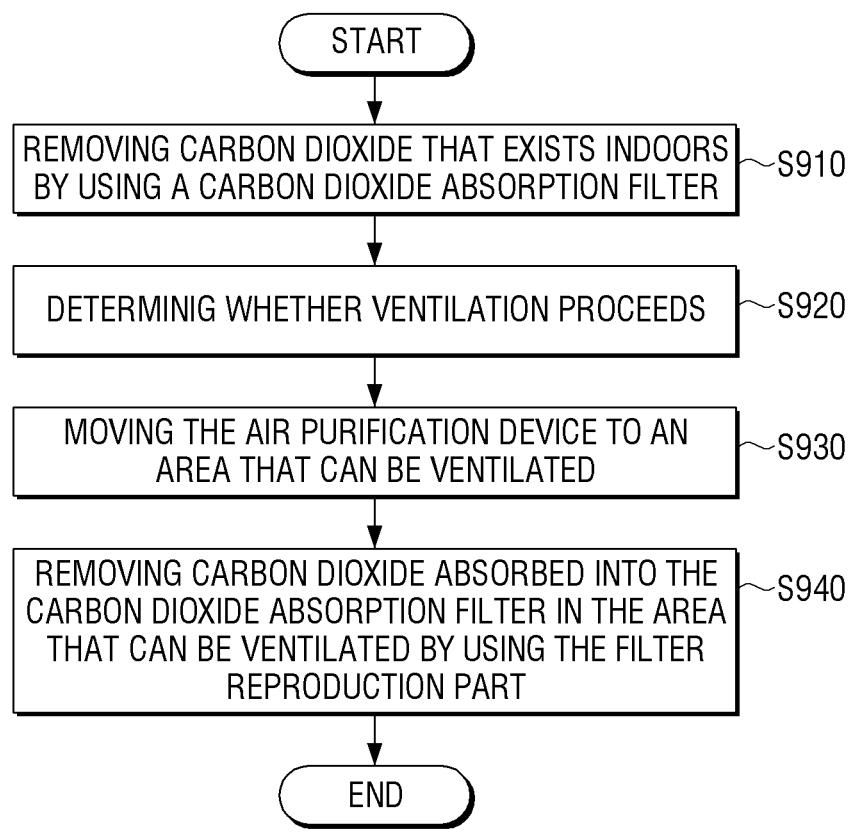
FIG. 9 is a flowchart illustrating a method of controlling an air conditioning device according to an embodiment of the disclosure.

FIG. 9 is a flowchart illustrating a method of controlling an air conditioning device according to an embodiment of the disclosure.

The air conditioning device 100 may remove carbon dioxide that exists indoors by using the carbon dioxide absorption filter at operation S910. Here, the air conditioning device 100 may remove carbon dioxide in an area in which carbon dioxide having concentration greater than or equal to the threshold concentration exists based on information on the concentration of carbon dioxide acquired through the sensor or information on the concentration of carbon dioxide received from an external sensing device.

Then, the air conditioning device 100 may determine whether ventilation will proceed at operation S920. Specifically, the air conditioning device 100 may determine whether ventilation will proceed based on information on opening of a window received from an external sensing device or an image photographed by the air conditioning device 100.

The air conditioning device 100 may move to an area that can support ventilation based on whether ventilation will proceed at operation S930.

Also, the air conditioning device 100 may remove carbon dioxide absorbed into the carbon dioxide absorption filter in the area that can support ventilation by using the filter reproduction part at operation S940. That is, the air conditioning device 100 may remove carbon dioxide absorbed into the carbon dioxide absorption filter by using heat or light generated by the filter reproduction part and discharge carbon dioxide to the outside.

Figure 10:
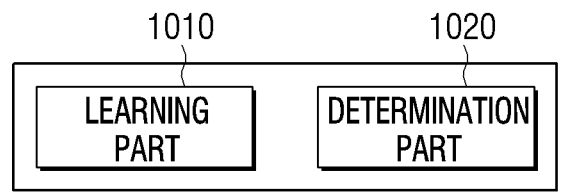
FIG. 10 is a diagram illustrating an operation of an air conditioning device using an artificial intelligence agent according to an embodiment of the disclosure.

FIG. 10 is a diagram illustrating an operation of an air conditioning device using an artificial intelligence agent according to an embodiment of the disclosure.

The memory 140 may include a learning part 1010 and a determination part 1020. Also, the processor 130 may execute the learning part 1010 stored in the memory 140, and thereby train the artificial intelligence agent to have a standard for providing responses. In particular, the learning part 1010 according to the disclosure may train an artificial intelligence model for acquiring a user's usage pattern or lifestyle pattern.

The processor 130 may execute the determination part 1020 stored in the memory 140, and thereby make the artificial intelligence agent determine a user's usage pattern or lifestyle pattern based on input data (e.g., image data, user input data, etc.). The determination part 1020 may determine a user's usage pattern or lifestyle pattern from specific input data by using the trained artificial intelligence model. Also, the determination part 1020 may acquire specific input data according to a predetermined standard, and apply the acquired input data to the artificial intelligence model as an input value, and determine (or, estimate) a user's usage pattern or lifestyle pattern based on the specific input data. In addition, a result value that was output by applying the acquired input data to the artificial intelligence model as an input value may be used for updating the artificial intelligence model.

Meanwhile, at least a portion of the learning part 1010 and at least a portion of the determination part 1020 may be implemented as a software module or in the form of at least one hardware chip, and installed on the air conditioning device 100. For example, at least one of the learning part 1010 or the determination part 1020 may be manufactured in the form of a dedicated hardware chip for artificial intelligence (AI), or as a portion of a conventional generic-purpose processor (e.g.: a CPU or an application processor) or a graphic-dedicated processor (e.g.: a GPU), and installed on the aforementioned server. Here, a dedicated hardware chip for artificial intelligence is a dedicated processor specialized in probability operations, and it has higher performance in parallel processing than conventional generic-purpose processors, and is capable of processing operation works swiftly in the field of artificial intelligence like machine learning. In a configuration the learning part 1010 and the determination part 1020 are implemented as a software module (or, a program module including instructions), the software module may be stored in a non-transitory computer readable recording medium. In this configuration, the software module may be provided by an operating system (OS), or a specific application. Alternatively, a portion of the software module may be provided by an operating system (OS), and the other portions may be provided by a specific application.

Also, the learning part 1010 and the determination part 1020 may be installed on one server, or they may be respectively installed on separate servers. For example, one of the learning part 1010 or the determination part 1020 may be included in the first server, and the other may be included in the second server. Also, the learning part 1010 and the determination part 1020 may be connected with each other by wire or wirelessly, and the model information constructed by the learning part 1010 may be provided to the determination part 1020, and the data input to the determination part 1020 may be provided to the learning part 1010 as additional learning data.

In addition, an artificial intelligence model may be constructed in consideration of the field to which the recognition model is applied, the purpose of learning, or the computer performance of a device, and the like. Also, a response provision model may be, for example, a model based on a neural network. In addition, a response provision model may be designed to simulate a human brain structure on a computer. Further, a response provision model may include a plurality of network nodes having weights that simulate neurons of the neural network of a human. The plurality of network nodes may each form a connection relationship to simulate synaptic activities of neurons exchanging signals via synapses. Also, a response provision model may include, for example, a neural network model, or a deep learning model developed from a neural network model. In a deep learning model, a plurality of network nodes may be located in different depths (or, layers) from one another, and exchange data according to a relationship of convolution connection. For example, models like a deep neural network (DNN), a recurrent neural network (RNN), a bidirectional recurrent deep neural network (BRDNN), and the like may be used as a response provision model, but the disclosure is not limited thereto.

By the various embodiments of the disclosure as described above, the concentration of carbon dioxide that exists in the indoor air is reduced, and accordingly, a user can be provided with a more pleasant indoor environment.

Also, the aforementioned various embodiments of the disclosure can be performed through an embedded server provided on an air conditioning device, or an external server of at least one of an air conditioning device or a display device.

Meanwhile, according to an embodiment of the disclosure, the aforementioned various embodiments of the disclosure may be implemented as software including instructions stored in machine-readable storage media, which can be read by machines (e.g.: computers). The machines refer to devices that call instructions stored in a storage medium, and can operate according to the called instructions, and the device may include an air conditioning device according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the methods according to the various embodiments described above may be provided while being included in a computer program product. A computer program product refers to a product, and it can be traded between a seller and a buyer. A computer program product can be distributed on-line in the form of a storage medium that is readable by machines (e.g.: a compact disc read only memory (CD-ROM)), or through an application store (e.g.: play store TM). In the case of on-line distribution, at least a portion of a computer program product may be stored in a storage medium such as the server of the manufacturer, the server of the application store, and the memory of the relay server at least temporarily, or may be generated temporarily.

In addition, according to an embodiment of the disclosure, the various embodiments described above may be implemented in a recording medium that can be read by a computer or a device similar to a computer, by using software, hardware, or a combination thereof. In some configurations, the embodiments described in this specification may be implemented by a processor itself. According to implementation by software, the embodiments such as processes and functions described in this specification may be implemented by separate software modules. Each of the software modules can perform one or more functions and operations described in this specification.

Meanwhile, computer instructions for performing processing operations of machines according to the aforementioned various embodiments may be stored in a non-transitory computer readable medium. Computer instructions stored in such a non-transitory computer readable medium make the processing operations at machines according to the aforementioned various embodiments performed by a specific machine, when the instructions are executed by the processor of the specific machine.

A non-transitory computer readable medium refers to a medium that stores data semi-permanently, and is readable by machines, but not a medium that stores data for a short moment such as a register, a cache, and a memory. As specific examples of a non-transitory computer readable medium, there may be a CD, a DVD, a hard disc, a blue-ray disc, a USB, a memory card, a ROM and the like.

Further, each of the components according to the aforementioned various embodiments (e.g.: a module or a program) may consist of a singular object or a plurality of objects. Also, among the aforementioned corresponding sub components, some sub components may be omitted, or other sub components may be further included in the various embodiments. Generally or additionally, some components (e.g.: a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

While the disclosure has been shown and described with reference to preferred embodiments thereof, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

Meanwhile, the methods according to the aforementioned various embodiments of the disclosure may be implemented in the form of applications that can be installed on conventional air conditioning devices.

Also, the methods according to the aforementioned various embodiments of the disclosure may be implemented only by software upgrade, or hardware upgrade for conventional air conditioning devices.

What is claimed is:

1. An air purification device for purifying indoor air, comprising:
    a driving part configured to control a position of the air purification device;
    a fan configured to circulate the indoor air;
    a carbon dioxide absorption filter configured to absorb carbon dioxide from the indoor air;
    a filter reproduction part configured to discharge the carbon dioxide absorbed into the carbon dioxide absorption filter;
    a communication interface; and
    a processor configured to:
    receive atmosphere information of an area through the communication interface,
    identify whether a predetermined change is detected in the received atmosphere information of the area,
    based on identification that the predetermined change is detected in the received atmosphere information of the area, control the driving part to move the air purification device to the area, and
    control the filter reproduction part to discharge the carbon dioxide absorbed into the carbon dioxide absorption filter based on the air purification device being positioned in the area,
    wherein the atmosphere information comprises at least one of a temperature, a humidity and a wind.

2. The air purification device of claim 1, further comprising a sensor configured to detect a concentration of the carbon dioxide in the indoor air,
    wherein the processor is further configured to:
    based on the concentration of the carbon dioxide in the indoor air detected through the sensor being greater than or equal to a threshold concentration, control the fan to circulate the indoor air through the carbon dioxide absorption filter.

3. The air purification device of claim 2, wherein the processor is further configured to:
    based on the concentration of the carbon dioxide detected through the sensor being greater than or equal to the threshold concentration, control the communication interface to transmit information on the concentration of the carbon dioxide to an external device.

4. The air purification device of claim 2, wherein the processor is further configured to:
    receive, from an external device, through the communication interface, sensing information of the concentration of the carbon dioxide in the indoor air in an in which the the external device is located,
    based on detecting the concentration of the carbon dioxide in the indoor air in the area in which the external device is located being greater than or equal to the threshold concentration based on the sensing information, control the driving part to move the air purification device to the area in which the external device is located, and
    control the fan to circulate the indoor air through the carbon dioxide absorption filter when the air purification device is positioned in the area in which the external device is located.

5. The air purification device of claim 1, wherein the processor is further configured to control and air purifying part of the air purification device to remove the carbon dioxide from the indoor air based on at least one of information on a current time, a season, or a user's pattern of the air purification device.

6. The air purification device of claim 1, wherein the processor is further configured to provide, to a user information on a time when discharging the carbon dioxide to outside air is possible based on air quality data according to each season.

7. The air purification device of claim 1,
    wherein the air purification device comprises a sensing device or the sensing device is an external device attached to at least one of a window or a door and the air purification device receives the atmosphere information from the external device through the communication interface.

8. The air purification device of claim 1, wherein the processor is further configured to:
    receive, from a temperature sensor, temperature information corresponding to heat or light provided from the outside,
    based on a current temperature of the temperature information being greater than or equal to a first threshold value, discharge the carbon dioxide absorbed into the carbon dioxide absorption filter by using solar heat, and
    based on the current temperature of the temperature being less than or equal to a second threshold value, control the filter reproduction part to discharge the carbon dioxide absorbed into the carbon dioxide absorption filter by generating heat or light.

9. The air purification device of claim 1, wherein the processor is further configured to:
    receive from a sensor, information corresponding to external ambient sunlight,
    based on detection of sunlight in the area based on the information corresponding to the external ambient sunlight, discharge the carbon dioxide absorbed into the carbon dioxide absorption filter by using the sunlight and solar heat, and based on detection of insufficient sunlight in the area based on the sunlight information, control the filter reproduction part to discharge the carbon dioxide absorbed into the carbon dioxide absorption filter by generating heat or light.

10. The air purification device of claim 1, wherein the carbon dioxide absorption filter is configured with at least one material among zeolite, a metal organic framework (MOF), a covalent organic framework (COF), and a covalent organic polymer (COP), and wherein the carbon dioxide absorption filter is coated with at least one of an amine series, KOH, or Li.

* * * * *